Sept. 11, 1956 W. ZIMMERMANN Re. 24,211

COOLING APPARATUS

Original Filed Feb. 16, 1953 2 Sheets-Sheet 1

INVENTOR

Wilhelm Zimmermann

BY Bailey, Stephens & Huettig
ATTORNEYS

COOLING APPARATUS

Original Filed Feb. 16, 1953 2 Sheets-Sheet 2

INVENTOR.
Wilhelm Zimmermann
BY
Bailey, Stephens & Huettig
ATTORNEYS

United States Patent Office

Re. 24,211
Reissued Sept. 11, 1956

24,211

COOLING APPARATUS

Wilhelm Zimmermann, Frankfurt, Germany, assignor to Metallgesellschaft Aktiengesellschaft, Frankfurt am Main, Germany, a corporation of Germany Original No. 2,669,032, dated February 16, 1954, Serial No. 337,100, February 16, 1953. Application for reissue February 10, 1956, Serial No. 564,847

Claims priority, application Germany March 29, 1952

8 Claims. (Cl. 34—174)

Matter enclosed in heavy brackets [ ] appears in the original patent but forms no part of this reissue specification; matter printed in italics indicates the additions made by reissue.

This invention relates to cooling apparatus. In particular, the invention is directed to an apparatus for cooling hot granular material such as might be received from a sintering apparatus.

Annular containers for cooling hot agglomerated material are known in the form of an annular chamber having a V-shaped cross-section into which the material is placed at the top and removed from the bottom. Cooling air is passed upwardly through the material. Such an apparatus is not entirely satisfactory as the cooling air cannot pass easily through the dense agglomerated material. This is particularly true when the material is piled to a height of two meters or more, in the chamber. An object of the instant invention is to produce an apparatus in which cooling air can be drawn quickly and effectively through hot agglomerated material regardless of the height to which the material is piled. A further object of the invention is to produce an apparatus which has an adequate capacity for cooling hot agglomerated material at a relatively rapid rate.

In general, these objects are accomplished by constructing a cooling chamber in the form of a ring or annulus, and constructing the inner circumference of the ring in the form of a louvered, Venetian blind-like, inclined wall. Spaced from this wall, and adjacent the outer circumference of the ring are a plurality of rather closely spaced grate bars forming the other side wall of the chamber. Hinged lids on top of the ring permit the introduction of hot agglomerated material, while corresponding hinged covers on the bottom of the ring permit the dumping of the cool material. The ring is adapted to be rotated about its vertical axis so that material received from a hopper is carried under one or more suction towers which draw air through the louvered wall, the hot material, and grate bars. The louvered wall and grate bars are inclined, and are so spaced that even though the material is piled as much as two meters high, it is much less thick, and the air equally passes through a thinner layer than in the prior type apparatus. Means are provided for automatically opening the lids for receiving a charge, and for automatically dropping the bottoms for dumping the material as the apparatus is revolved.

The invention is further described with reference to the accompanying drawings in which.

The apparatus is composed of a ring-like housing 10 mounted on rollers 12 for rotation about its vertical axis.

Figure 4:
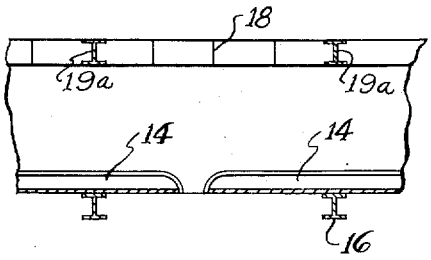
Figure 4 is a cross-sectional view through the cooling chamber on the line 4—4 of Figure 2.

The inner circumference of the apparatus is composed of *an air pervious member such as* a louvered Venetian blind-like member 14 supported on frame 16, louvered member 14 being inclined toward the vertical axis of the housing. As indicated in Figure 4, the slats forming the louvers are in sections so as to conform with the curvature of the apparatus. Spaced from member 14 toward the outer circumference of the housing are a plurality of bars 18 slightly spaced from each other to form a grate, these bars likewise being inclined. *Member 14 and bars 18 are downwardly divergent with respect to each other to form a downwardly widened cooling chamber.* The apparatus has an overall frame 19, which is extended by beams 19a to support the bottom of the cooling chamber, and bars 18. The outer shell of housing 10 is composed of a wall 20, which together with the inner wall 22 constitutes an annular flue. On the top of the ring-like housing 10 are a plurality of lids 24, these lids being in the form of sectors and extending continuously around the top of housing 10. The lids are hinged at 26 to the apparatus frame and are extended into cam followers 28 which are guided by a cam roller 30.

The bottom of the chamber is composed of a plurality of plates 32 attached at their upper edges by hinges 34 to the apparatus frame. Rollers 33 secured to bottoms 32 bear against a rail 33a to hold the bottoms closed, except at the point of dumping cooled material. These bottom plates correspond in number and position to lids 24.

Figure 1:
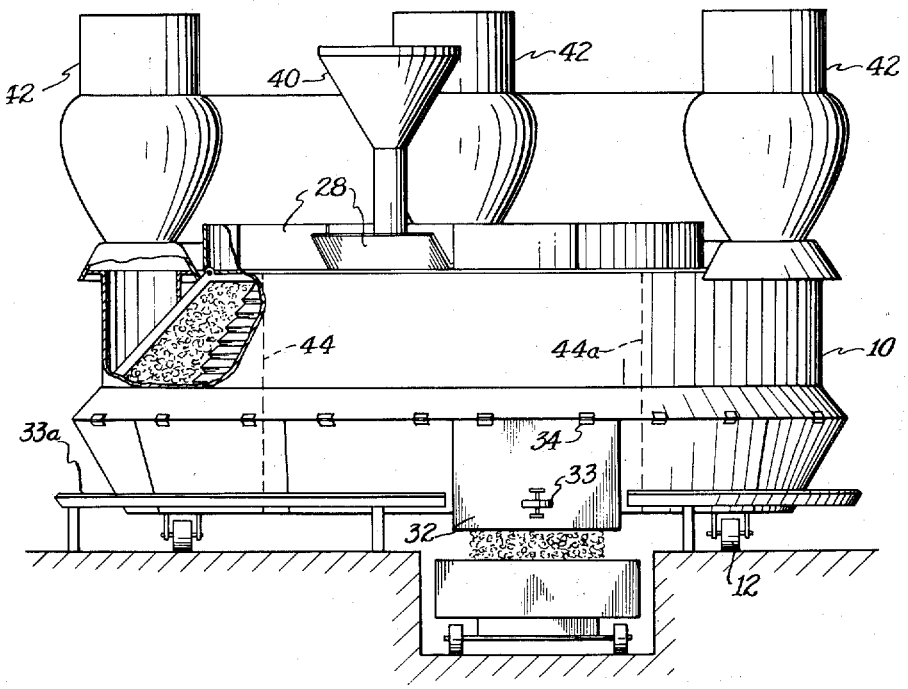
Figure 1 is a front view of the apparatus.

The apparatus is adapted to be rotated successively beneath hopper 40 and suction chimneys or towers 42, all of which are supported by an independent framing not shown. In order to close off the upper outlet of the flue formed beneath walls 20 and 22 in between the towers, a horizontal shielding 45 extends between the towers. This circular suction space is also substantially sealed from the hopper zone and dumping zones, indicated by the dotted lines 44 and 44a, respectively, in Figure 1, by the material in the cooling chamber.

The [louvered] *air pervious* member 14 is such as to provide the greatest number possible openings for the passage of air, while at the same time preventing the agglomerate from falling through the openings. Therefore, the width of the slats is approximately equal to the openings between the various blades, and these openings are directed slightly downwardly to prevent the material from falling through. The passage of air through the cooling chamber is assisted by suction fans 49 placed in the suction towers 42. As the flue passes beneath each suction tower, an air-tight seal is effected by the plates 46, hanging down from the tower and engaging flanges 48 on the top edge of the flue.

Figure 2:
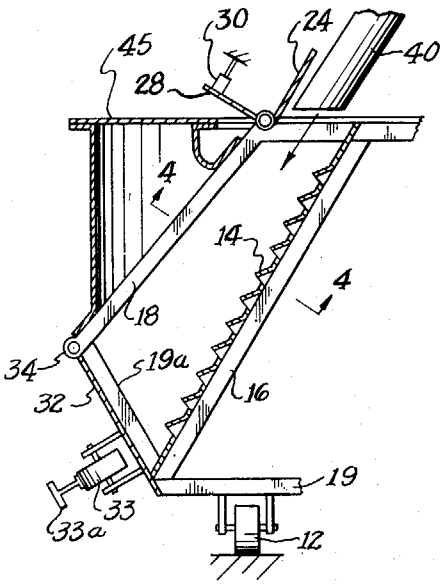
Figure 2 is a diagrammatic crosss-ectional view through a portion of the apparatus at the feed hopper.
Figure 3:
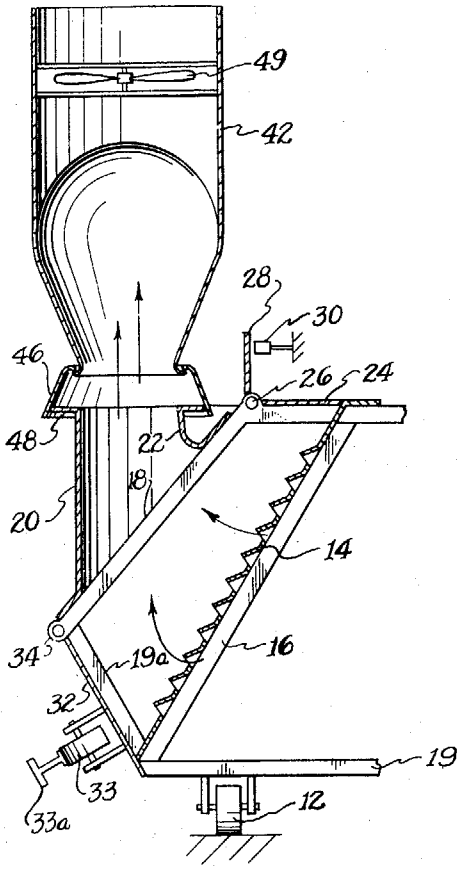
Figure 3 is a cross-sectional view through the apparatus at a suction tower.

In operation, hot agglomerate material is dumped into the chamber, the material resting on *air pervious or* louvered member 14 and being confined by grate bars 18, the bottom door being held closed by the wheel 33 bearing on rail 33a. The lid is held open by cam follower 28, note Figure 2. As the housing 10 revolves clockwise, note Figure 1, the lids drop closed, and the charge passes beneath the first suction tower 42, air being drawn transversely through the material to cool it. Each successive lid is thus opened and closed as it passes beneath hopper 40. At the end of the cycle, as the apparatus turns by dumping zone at 44a, the wheel 33 leaves the track 33a and the bottom, being hinged at its top edge, drops open to dump the charge into a truck, or a belt conveyor of some sort. The bottom is closed by re-engaging rail 33a before a new charge is received from the hopper.

The apparatus is of simple rugged construction, and very effective in the cooling of large volumes of hot agglomerate material.

Having now described the means by which the objects of the invention are obtained, I claim:

1. An apparatus for cooling hot agglomerated material comprising an annular housing, means mounting said housing for rotation about its vertical axis, a louvered inclined member forming the inner circumferential wall of said housing, inclined grate bars spaced from said louvered member to form a cooling chamber therebetween, a plurality of inclined plates hinged at their upper edges to said housing and forming the bottom of said chamber, means for feeding hot material into the top of said chamber, and means for holding said bottom plates closed during the cooling of said material and for releasing said plates to swing open on their hinged edges to dump cooled material.

[2. An apparatus as in claim 1 further comprising a plurality of lids hinged to said housing on top of said chamber, and means for lifting said lids when hot material is fed to said chamber.]

[3. An apparatus as in claim 2 further comprising an annular flue mounted above said grate bars, and at least one suction tower mounted above said flue.]

[4. An apparatus as in claim 3 further comprising a suction fan in said tower for drawing air through said louvered member and the hot material in said chamber into said tower.]

[5. An apparatus as in claim 4, said means for holding said bottom plates comprising a rail surrounding said housing adjacent said bottom plates except at the dumping zone, and rollers mounted on said bottom plates and engaged with said rail.]

[6. An apparatus as in claim 5, said louvered member comprising a Venetian blind like element having slats of a width approximately equalling the opening between adjacent slats.]

*7. An apparatus for cooling hot agglomerated material comprising an annular housing, means mounting said housing for rotation about its vertical axis, a louvered inclined member forming the inner circumferential wall of said housing, inclined grate bars spaced from said louvered member to form a cooling chamber therebetween, a plurality of plates hinged to said housing and forming the bottom of said chamber, means for feeding hot material into the top of said chamber, and means for holding said bottom plates closed during the cooling of said material and for releasing said plates to swing open on their hinges to dump cooled material.*

*8. An apparatus as in claim 7, said louvered member and grate bars being divergent with respect to each other and forming a downwardly widened cooling chamber.*

*9. An apparatus as in claim 7 further comprising a plurality of lids hinged to said housing on top of said chamber, and means for lifting said lids when hot material is fed to said chamber.*

*10. An apparatus as in claim 9 further comprising an annular flue mounted above said grate bars, and at least one suction tower mounted above said flue.*

*11. An apparatus as in claim 10 further comprising a suction fan in said tower for drawing air through said louvered member and the hot material in said chamber into said tower.*

*12. An apparatus as in claim 11, said means for holding said bottom plates comprising a rail surrounding said housing adjacent said bottom plates except at the dumping zone, and rollers mounted on said bottom plates and engaged with said rail.*

*13. An apparatus as in claim 7, said louvered member comprising a Venetian blind like element having slats of a width approximately equalling the opening between adjacent slats.*

References Cited in the file of this patent or the original patent

UNITED STATES PATENTS

| | | |
|---|---|---|
| 1,558,119 | Sherban | Oct. 20, 1925 |
| 2,256,017 | Curran | Sept. 16, 1941 |
| 2,641,064 | Foner | June 9, 1953 |
| 2,669,032 | Zimmermann | Feb. 16, 1954 |

FOREIGN PATENTS

| | | |
|---|---|---|
| 640,773 | Germany | Jan. 12, 1937 |